(12) United States Patent
Haeusser-Boehm

(10) Patent No.: US 6,605,980 B2
(45) Date of Patent: Aug. 12, 2003

(54) SYNCHRONOUS RECTIFIER CIRCUIT

(75) Inventor: Helmut Haeusser-Boehm, Munich (DE)

(73) Assignee: Patent-Treuhand-Gesellschaft fuer elektrische Gluehlampen mbH, Munich (DE)

(*) Notice: Subject to any disclaimer, the term of this patent is extended or adjusted under 35 U.S.C. 154(b) by 0 days.

(21) Appl. No.: 09/963,539

(22) Filed: Sep. 27, 2001

(65) Prior Publication Data

US 2002/0039043 A1 Apr. 4, 2002

(30) Foreign Application Priority Data

Sep. 29, 2000 (DE) .......................... 100 48 404

(51) Int. Cl.$^7$ ............................... H02M 7/00
(52) U.S. Cl. ................... 327/531; 327/330; 327/532
(58) Field of Search ................ 327/531, 532, 327/537, 538, 330; 363/17, 127

(56) References Cited

U.S. PATENT DOCUMENTS 5,892,664 A * 4/1999 Vedder ..................... 363/17
6,169,683 B1 * 1/2001 Farrington ................. 363/127
6,246,594 B1 * 6/2001 Matsuda et al. ............. 363/17

* cited by examiner

Primary Examiner—Tuan T. Lam
Assistant Examiner—Hiep Nguyen
(74) Attorney, Agent, or Firm—Carlo S. Bessone

(57) ABSTRACT

The present invention relates to a synchronous rectifier circuit having a transformer (Ü) in single-phase center-tap connection. MOSFETs containing a body diode are used as switches. The MOSFETs are connected up in such a way that a current flows only from source to drain. The channel of the MOSFETs is always switched on if current would flow through the body diode.

5 Claims, 3 Drawing Sheets

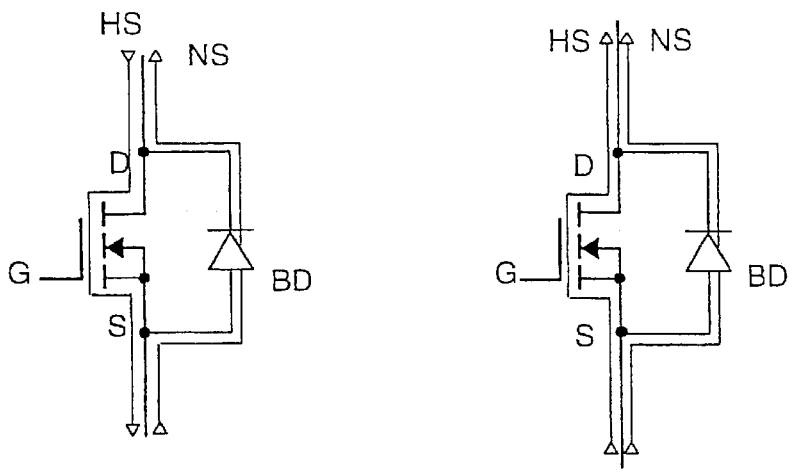
FIG. 1
Prior Art
FIG. 2
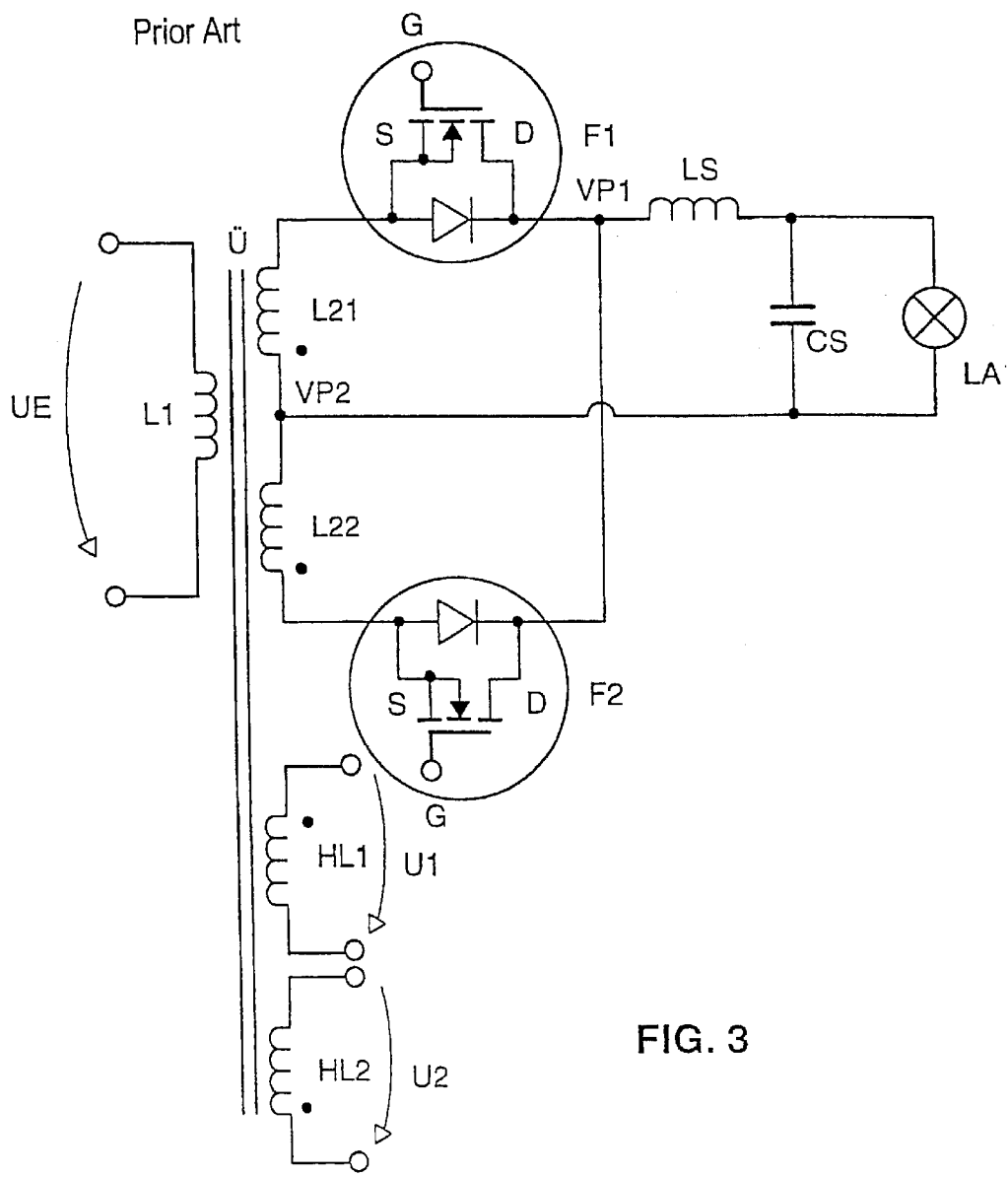
FIG. 3

SYNCHRONOUS RECTIFIER CIRCUIT

The present invention relates to a rectifier circuit, in particular a rectifier circuit having a transformer, which has a primary side and a secondary side, the primary side having a first and a second input terminal for coupling in an AC voltage signal, and the secondary side comprising two secondary windings which are connected to one another and to a first output terminal, the first and the second secondary winding being connected by their other terminal to a first terminal of a first and a second diode disposed in the forward direction, and the second terminal of the first and of the second diode being connected to one another and to a second output terminal, it being possible for a load to be coupled between the first and second output terminals, the first and the second diode being realized by a first and a second MOSFET at least within a predetermined time range, by virtue of the fact that each MOSFET has a main current path with a main current direction HS and an auxiliary current path—disposed parallel to the main current path—with an auxiliary current direction NS and with a body diode disposed therein, the main current direction HS and the auxiliary current direction NS running opposite to one another, and it being possible for the first and the second MOSFET to be operated in such a way that the first and the second body diode realize the first and the second diode within the predetermined time range.

PRIOR ART

The literature discloses a rectifier circuit designated as single-phase center-tap connection. Rectifier circuits of this type are used, for example, to feed long rail and cable systems with electronic transformers. In this case, they serve for rectifying and smoothing the high-frequency output voltage. Without these two measures, the voltage drop along the line and the radio interference would be too high.

In a rectifier circuit of this type, the diodes required for rectification are often replaced by MOSFETs, in this case specifically by the body diode present in each MOSFET. FIG. 1 illustrates a MOSFET by way of example, the three terminals being marked D for drain, G for gate and S for source. The body diode is designated by BD. The direction in which current normally flows through the MOSFET, the so-called main current direction HS, runs from drain to source. The auxiliary current direction NS is disposed parallel and runs oppositely to the main current direction HS, as indicated by the arrows. If, in this circuit, the gate is not driven by a signal, then the MOSFET, via its body diode BD, acts like a normal diode, i.e. it permits a current flow only in one direction, to be precise in the auxiliary current direction NS as defined above. The disadvantage of this rectifier circuit disclosed in the prior art consists in the high power loss. In order to be able to supply the lamps fitted to the rail and cable systems with sufficient power, very high currents flow in the rectifier circuit, for example in the range between 20 and 40 A. In the case of a current of 25 A, for example, a power loss of 17.5 W is therefore produced on the diode, given a voltage drop across the diode of 0.7 V.

The same problems arise in the case of electronic transformers for rail and cable systems, in which the rectification is realized using schottky diodes. As a consequence of the high power loss, either use only at low ambient temperatures is considered or a fan has to be used for cooling, the service life of said fan being highly limited and being between 10,000 and 20,000 hours.

SUMMARY OF THE INVENTION

Taking this prior art as a departure point, the object of the present invention therefore consists in developing a rectifier circuit of the type mentioned in the introduction in such a way that the power loss is considerably reduced.

This object is achieved according to the invention by virtue of the fact that a rectifier circuit of the generic type furthermore comprises a first and a second drive circuit, which are designed to drive the first and the second MOSFET with regard to the current flow in the main current path in such a way that the current flow in the main current path is effected in the auxiliary current direction NS.

The invention is based on the insight that, in order to realize a diode function, not only can the body diode of a MOSFET which lies in the auxiliary current direction NS be used, but also, by active driving in a suitable manner, the main current path of a MOSFET. It is furthermore based on the insight that MOSFETs can also be operated inversely with regard to their main current direction HS, which runs from the drain to the source, without incurring damage. In this case, the driving for inverse operation corresponds to the driving during forward operation, i.e. the crucial voltage is the voltage present across the MOSFET between gate and source. With the MOSFET being switched into the on state by suitable driving of the gate, the current flowing through it therefore only has to overcome a very low forward resistance, which is of the order of magnitude of 6 mΩ. For the current of 25 A assumed by way of example above, a power loss of just 3.7 W is produced as a result. This low power loss makes it possible to operate a rectifier circuit according to the invention even at high ambient temperatures without using a fan.

In a preferred embodiment, the first and the second drive circuit can be operated in such a way that the current flow through the respective MOSFET is effected in the main current path in the auxiliary current direction NS at least in a first time range and in the auxiliary current path in the auxiliary current direction NS in a second time range. This measure makes it possible for the diode function to be realized by the main current path in a first time range—by suitable driving of the gate—and in a customary manner by the body diode of the MOSFET in a second time range. The realization of the diode function by the body diode should, of course, be considered with regard to the reduction of the power loss only when the total current flowing through the MOSFET has a very small value or the time range in which the current flows is very short and hence the power loss of this current on the body diode is very low. This is the case in particular in the event of commutation of the current from one transistor to the other.

Furthermore, it is preferably provided that the first and the second drive circuit can be operated in such a way that no current flow at all takes place through the respective MOSFET at least in a third time range.

In a particularly advantageous embodiment, the first and the second drive circuit comprise a first and a second auxiliary winding connected to the transformer. This makes it possible to generate the drive signals for the two MOSFETs in conjunction with a very low outlay. When a large current is transformed by the transformer, the auxiliary windings generate a large signal, which is used for driving the gate electrode of the respective MOSFET. With this large signal, the MOSFETs can be switched without any difficulty into the on state, which is why the current which is actually flowing through the MOSFETs exactly at this moment traverses the MOSFET in the main current path, but in the auxiliary current direction NS. If only a very small current is transformed by the transformer, the signal obtained via the auxiliary windings does not suffice, under certain circumstances, to switch the respective MOSFET into the on state by driving of the respective gate electrode. This is entirely unproblematic in the present case, however, since it is exactly then that the current is also small which now flows through the respective MOSFET in the auxiliary current path in the auxiliary current direction NS and thus only a low power loss is produced on the body diode. If the two auxiliary windings are, moreover, assigned to the secondary side in terms of potential, the DC isolation between primary side and secondary side is realized in a particularly cost-effective and simple manner in this way. As an alternative, however, provision may also be made for the signals required for driving the MOSFETs to be generated on the primary side of the transformer by means of corresponding logic gates and to be transferred to the secondary side via very fast optocouplers or so-called SELV (Security Extra Low Voltage) transformers. When optocouplers are used, it is preferred to build up a supply voltage on the secondary side from the output voltage, which supply voltage supplies the respective drive circuit.

The respective drive circuit preferably comprises a respective modification network disposed between the respective auxiliary winding and the respective MOSFET and serving for modifying the output signal of the respective auxiliary winding. In particular, the effect that can be achieved with a modification network of this type is that the voltage provided by the auxiliary windings rises nonlinearly in order to make available, even when transforming low currents, a voltage which suffices to switch the respective MOSFET into the on state. Furthermore, the respective modification network should provide voltage limiting in order that an excessively high voltage is not applied to the gate of the respective MOSFET, which might lead to the destruction thereof. In particular, it is preferred to dimension the modification network in such a way that the voltage to be coupled to the gate of the respective MOSFET rises rapidly above 10 V in a non-linear manner and is limited at 18 V.

In accordance with a particularly preferred embodiment, the first and the second modification network are designed in such a way that, during a commutation of the current from the first MOSFET to the second, and vice versa, it is always the case that at least one of the two MOSFETs is turned on. This measure ensures that even in the so-called dead time, the current flow is not effected via the auxiliary current path, i.e. via the body diode, but rather via the main current path. In other words, even during the dead time, the power loss incurred is merely the product of forward resistance of a MOSFET and current flowing through it.

This is preferably achieved in that the first and the second modification network are designed in such a way that a changeover of the first and second MOSFETs from the on to the off state and/or vice versa is essentially effected in two stages, the first stage being correlated with the commutation from the on to the off state, while the second stage is correlated with the on or off state of the respective MOSFET.

Further advantageous embodiments emerge from the subclaims.

DESCRIPTION OF THE DRAWINGS

An exemplary embodiment is described in more detail below with reference to the accompanying drawings, in which:

FIG. 1 illustrates, in a schematic circuit, a MOSFET for definition of main current direction HS and auxiliary current direction NS, as are oriented in rectifier circuits according to the prior art;

FIG. 2 illustrates, in a schematic circuit, a MOSFET for definition of main current direction HS and auxiliary current direction NS, as are oriented in a rectifier circuit according to the invention.

FIG. 3 illustrates a schematic representation of a rectifier circuit according to the invention;

FIG. 2 shows, in a schematic representation, a MOSFET with main current direction HS and secondary current direction NS when the MOSFET is used in a rectifier circuit according to the invention. As is clearly revealed by a comparison of FIG. 1 and FIG. 2, the auxiliary current direction NS has remained identical, whereas the main current direction HS takes exactly the opposite course. The MOSFET of FIG. 2 is accordingly operated inversely with regard to the current flowing through it.

FIG. 3 shows, in a schematic representation, a rectifier circuit according to the invention having a transformer Ü, on whose primary side a primary inductance L1 is supplied with a voltage UE, which is a voltage with an AC voltage component, in particular an AC voltage. On the secondary side, the transformer comprises a first secondary inductance L21 and a second secondary inductance L22. The circuit furthermore comprises, disposed in series with the respective secondary inductance, a first MOSFET F1 and also a second MOSFET F2. For better identification of main and auxiliary current directions HS, NS, the body diode has also been depicted in both MOSFETs. The two sides of the respective MOSFET F1, F2 which are remote from the respective secondary inductance L21, L22 are connected to one another to form a first junction point VP1. A smoothing network comprising an inductance LS and a capacitor CS is disposed between the first junction point VP1 and a second junction point VP2, at which the two secondary inductances are connected to one another. A load LA, for example a lamp, is connected in parallel with the capacitor CS.

Furthermore, there are disposed on the secondary side of the transformer Ü a first auxiliary inductance HL1 and a second auxiliary inductance HL2, whose output voltage U1 and U2, respectively, is used for driving the first MOSFET F1 and the second MOSFET F2, respectively, via the respective gate electrode.

Figure 4:
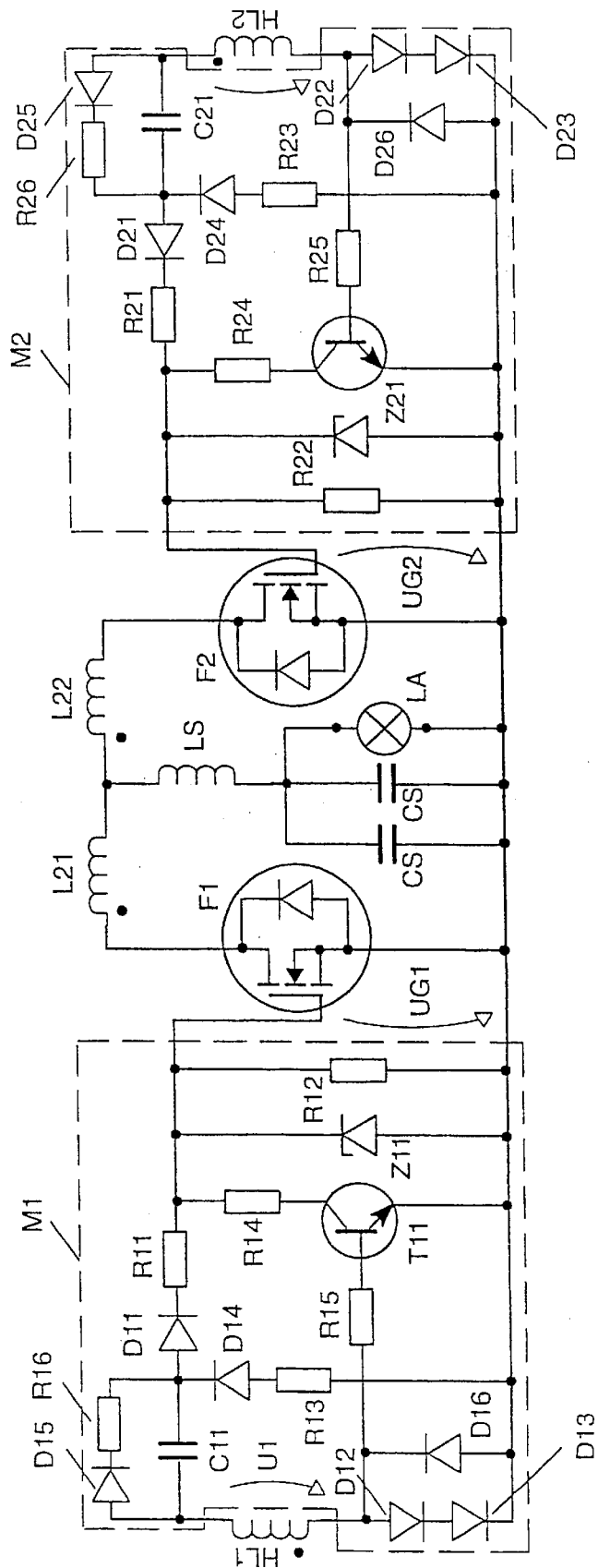
FIG. 4 illustrates a circuit diagram of an embodiment of a rectifier circuit according to the invention.

An embodiment of a rectifier circuit according to the invention is illustrated in FIG. 4, where components which correspond to those of FIG. 3 are designated by the same reference symbols. The primary inductance L1 is not illustrated. In addition to the components L21, L22, LS, LA, CS, F1, F2, HL1, HL2 already mentioned, FIG. 4 illustrates the drive circuit M1 for the MOSFET F1 and also the drive circuit M2 for the MOSFET F2. Their function will be described using the example of the drive circuit M1:

If the voltage U1 rises from negative values to 0 V, it drives a current via D16, C11, D11 and R11 to the gate of the MOSFET F1 and charges the gate to approximately half of the available voltage. If the voltage U1 becomes positive, the gate is charged to the full voltage. The gate voltage is limited to 18 V by the zener diode Z11. The resistor R12 serves for reliably terminating the gate in order that no static charges destroy the MOSFET F1. Moreover, the resistor R12 serves for discharging the gate when the driving is stopped. If the voltage U1 becomes negative, a current only flows from the auxiliary winding HL1 via D12, D13, R13, D14 and C11. In the process, C11 is subjected to charge reversal and the transistor T11 short-circuits the gate voltage at a stroke via the resistor R14. The base resistor R15 serves for better decoupling of the current. As soon as the gate is charged, a discharge takes place continuously via R12. The gate is recharged again via D15 and R16.

The drive circuit M2 has corresponding components and functions correspondingly.

Figure 5:
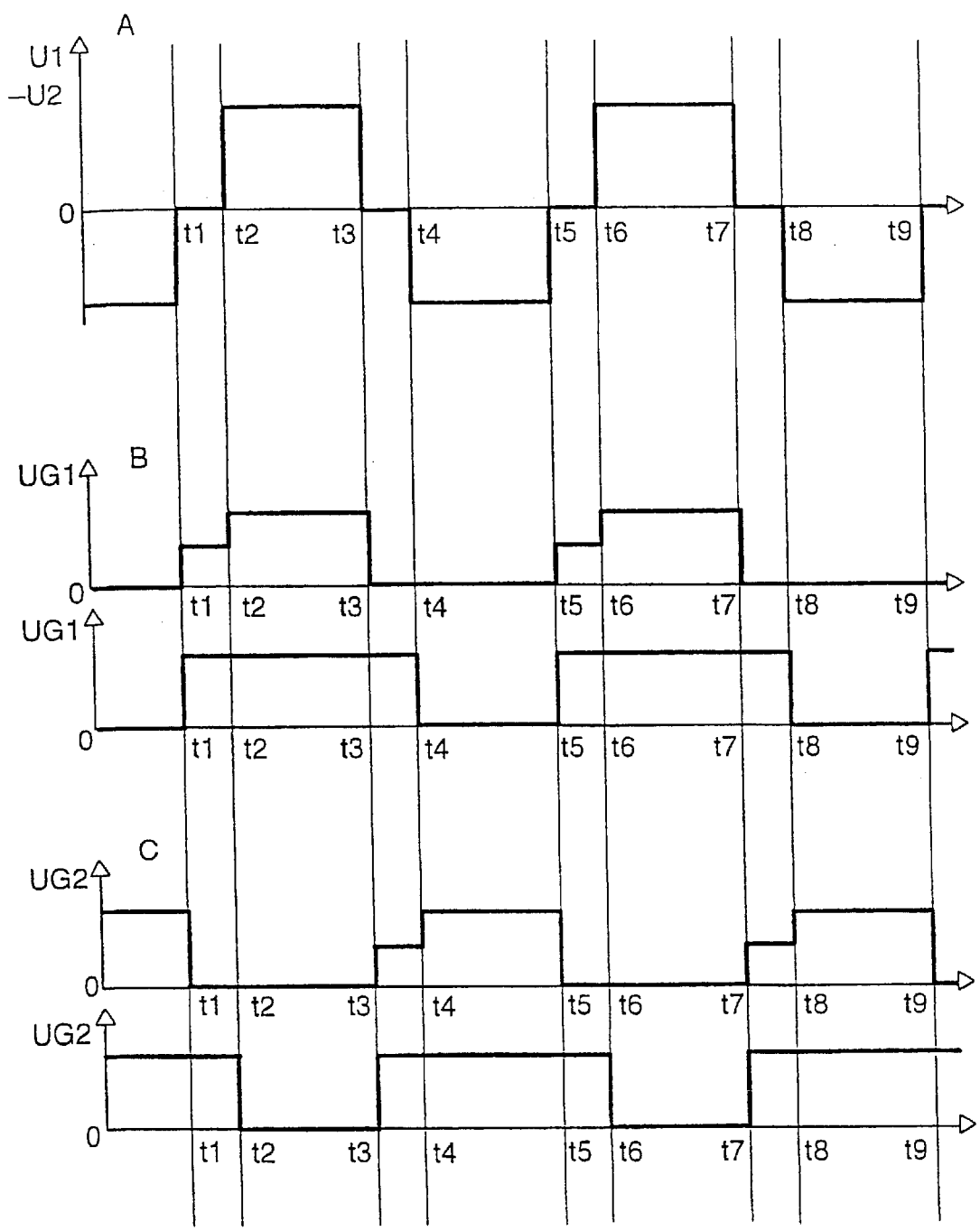
FIG. 5 illustrates, in a schematic representation, the profile of the transformer voltage and also of the gate voltages of the two MOSFETs of FIG. 4 over time.

FIG. 5 shows the time profiles of a few selected voltages from the embodiment of FIG. 4. The voltage profile on the transformer Ü is illustrated schematically in diagram A. In principle, the profile is identical (apart from transfer factors) for the voltage dropped across the primary inductance L1, across the secondary inductances L21, L22 and also across the auxiliary inductances HL1, HL2. With regard to the driving of the two MOSFETs, however, the profile of the voltages U1 and U2 is of considerable significance. Diagram A shows the profile of U1 and –U2. Diagram B shows the time profile of the gate voltage UG1 of the MOSFET F1, and diagram C shows the corresponding time profile of the gate voltage UG2 of the MOSFET F2. In diagram B and C, the respective upper curve shows the time profile for a first dimensioning of the respective drive network, and the lower curve shows the time profile for a second dimensioning.

Firstly with regard to the first dimensioning:

It can be seen that in the case of a rising voltage from negative values at the instant t1, the voltage UG1 firstly rises to half the maximum value and increases to the full value only at the instant t2, when U1 becomes positive. The time period between t1 and t2, and likewise the time period between t3 and t4, t5 and t6 and also t7 and t8, is the so-called dead time, i.e. the time period in which the current commutates from the MOSFET F1 to the MOSFET F2, and vice versa. In the case of the first dimensioning, the gate voltage UG1 is 0 V between t3 and t4, i.e. the MOSFET F1 changes over to the off state. A new cycle begins at the instant t5.

On account of the opposite orientation of the auxiliary winding HL2 in comparison with the auxiliary winding HL1, the voltage U2 has an inverse profile with respect to the voltage U1. This continues—taking account of the two-stage switch-on operation—in the case of the gate voltage UG2. In other words: as soon as the voltage U1 returns to zero from positive values, there is a jump in the gate voltage UG2 to half the maximum value, a jump to the full maximum value subsequently being effected as soon as U1 becomes negative. As can be seen, during the dead time, at least one of the two MOSFETs F1, F2 is switched into the on state, i.e. the MOSFET F2 during the dead time between t3 and t4, the MOSFET F1 during the dead time between t5 and t6, etc.

With regard to the second dimensioning:

The respective second dimensioning differs from the first dimensioning merely in that both MOSFETs F1, F2 are in the on state during the dead times. The fact that at least one MOSFET is in the on state ensures that the respective current does not flow via the body diode, but rather via the respective main current path. It should be noted that, in the region of the respective dead time, the currents which flow through the respective MOSFET flow only in a very short time range and, therefore, would also lead only to a low power loss on the body diode.

What is claimed is:

1. A rectifier circuit comprising:
   a transformer (Ü) having a primary side (L1) and a secondary side (L21,L22), the primary side (L1) having a first and a second input terminal for coupling in an AC voltage signal (UE), and the secondary side comprising two secondary windings (L21,L22) which are connected to one another and to a first output terminal (VP2), the first and the second secondary winding (L21,L22) being connected by their other terminal to a first terminal of a first and second body diode (BD) of a respective first and second MOSFET (F1,F2) disposed in the forward direction, and the second terminal of the first and of the second body diode being connected to one another and to a second output terminal (VP1), it being possible for a load (LA) to be coupled between the first and second output terminals,
   the first and the second MOSFET (F1,F2) each has a main current path with a main current direction (HS) and an auxiliary current path disposed parallel to the main current path with an auxiliary current direction (NS) and with a respective body diode (BD) disposed therein, the main current direction (HS) and the auxiliary current direction (NS) running oppositely to one another, and
   a first and a second drive circuit (M1,M2,HL1,HL2) for driving the first and the second MOSFET (F1,F2) such that the current flow in the main current path is in the auxiliary current direction (NS) within a predetermined time period, the first and the second drive circuit (M1,M2,HL1,HL2) comprise a first and a second auxiliary winding (HL1,HL2) connected to the transformer (Ü), and a respective modification network (M1;M2) is disposed between the respective auxiliary winding (HL1;HL2) and the respective MOSFET (F1;F2) for modifying the output signal of the respective auxiliary winding (HL1;HL2).

2. The rectifier circuit as claimed in claim 1, wherein the first and the second drive circuit (M1,M2,HL1,HL2) cause current flow through the respective MOSFET (F1,F2) in the main current path in the auxiliary current direction (NS) at least in a first time period and in the auxiliary current path in the auxiliary current direction (NS) in a second time period.

3. The rectifier circuit as claimed in claim 2, wherein the first and the second drive circuit (M1,M2,HL1,HL2) can be operated in such a way that no current flow at all takes place through the respective MOSFET (F1;F2) at least in a third time period.

4. The rectifier circuit as claimed in claim 1, wherein the first and the second modification network (M1;M2) are designed in such a way that, during a commutation of the current from the first MOSFET (F1) to the second (F2), and vice versa, it is always the case that at least one of the two MOSFETs (F1;F2) is turned on.

5. The rectifier circuit as claimed in claim 4, wherein the first and the second modification network (M1;M2) are designed in such a way that a changeover of the first and second MOSFETs (F1;F2) from the on to the off state and/or vice versa is essentially effected in two stages, the first stage being correlated with the commutation from the on to the off state and/or vice versa, while the second stage is correlated with the on or off state of the respective MOSFET (F1;F2).

* * * * *